United States Patent [19]

Vaessen

[11] 3,991,899
[45] Nov. 16, 1976

[54] CYLINDRICAL PRESSURE CHAMBER FOR NUCLEAR REACTOR OR THE LIKE

[75] Inventor: Franz Vaessen, Essen-Bredeney, Germany

[73] Assignee: Hochtief AG fur Hoch- und Tiefbauten, Essen, Germany

[22] Filed: Oct. 22, 1974

[21] Appl. No.: 517,014

[30] Foreign Application Priority Data
Oct. 24, 1973  Germany............................ 2353179

[52] U.S. Cl.................................... 220/15; 52/573; 176/38
[51] Int. Cl.² .......................................... B65D 25/18
[58] Field of Search ......... 220/15, 9 A, 9 LG, 63 R; 176/87, 38; 52/249, 573

[56] References Cited
UNITED STATES PATENTS

| 3,129,836 | 4/1964 | Frevel | 220/15 |
| 3,147,878 | 9/1964 | Wissmiller | 220/15 X |
| 3,347,402 | 10/1967 | Forman et al. | 220/15 |
| 3,711,371 | 1/1973 | Cahill | 176/87 X |
| 3,734,827 | 5/1973 | Schilling | 176/87 |
| 3,779,420 | 12/1973 | Knaus | 220/63 R |

Primary Examiner—Richard E. Aegerter
Assistant Examiner—Michael H. Thaler
Attorney, Agent, or Firm—Karl F. Ross; Herbert Dubno

[57] ABSTRACT

A cylindrical pressure chamber, designed to contain a hot expanding fluid in a nuclear reactor, has a refractory peripheral wall provided with a cooled metal lining surrounding a ceramic insulating layer which is shielded from the fluid by an inner metallic shell. The shell is separated from the ceramic layer, in the nonoperating state, by an annular clearance allowing its expansion under internal fluid pressure to pretension that shell so as to reduce the thermally induced stress to less than the yield point of the metal. The ceramic layer is anchored to the lining by radial bolts and has radial bores slidably engaged by guide studs welded to the shell.

7 Claims, 3 Drawing Figures

CYLINDRICAL PRESSURE CHAMBER FOR NUCLEAR REACTOR OR THE LIKE

FIELD OF THE INVENTION

My present invention relates to a cylindrical pressure chamber designed to contain a hot expanding fluid, more specifically a pressure chamber used in a nuclear reactor.

BACKGROUND OF THE INVENTION

Conventional pressure chambers of this kind comprise a cylindrical structure forming a refractory peripheral wall, this wall being internally provided with a first metallic lining surrounding a ceramic insulating layer of low thermal conductivity. The insulating layer, in turn, is provided with a second, inner metallic lining protecting it from the confined fluid. The insulating layer may consist of concrete, for example; the tubular linings coaxially bracketing that layer are usually made of steel.

In operation, the inner lining undergoes considerable heating and tends to expand radially as well as axially. Its radial distension is blocked, however, by the insulating layer whose thermal coefficient of expansion is substantially lower than that of steel. This places the inner lining under considerable stress, often exceeding its yield point and leading to an early destruction thereof, particularly if the pressure chamber is repeatedly taken out of service so that the lining undergoes recurrent cooling and heating.

OBJECT OF THE INVENTION

The object of my present invention, therefore, is to provide an improved construction for such a pressure chamber which avoids the aforestated disadvantages and increases the service life of its peripheral wall structure.

SUMMARY OF THE INVENTION

I realize this object, pursuant to my present invention, by replacing the conventional inner metallic lining with a metal shell or tube separated from the insulating layer, in an unoperated state of the assembly, by an annular clearance enabling radial expansion of the shell under pressure of the confined fluid as soon as operations are started. This expansion is, of course, limited by the depth of the clearance, which is sufficient to enable pretensioning of the shell in peripheral direction for reducing the thermally induced stresses therein to less than the yield point of the metal.

If the outer peripheral wall surrounding the insulating layer is provided with a cooled metallic lining as in conventional nuclear reactor chambers, this lining may carry anchor means engaging that layer. On the other hand, the layer is provided with countersunk guide means bridging the intervening clearance and engaging the inner metallic shell to facilitate its radial displacement relative to the layer. The guide means may comprise a number of sleeves seated in radial bores of the layer and a corresponding number of studs slidably received in these sleeves, the studs preferably having retaining heads of larger diameter than the sleeves limitedly displaceable in extensions of the bores beyond the sleeves.

The insulating layer may be axially subdivided into tiers of sectoral blocks with interlocking trapezoidal profiles in an axial plane, the profiles of adjoining tiers converging alternately toward the periphery and toward the axis. In such a case I prefer to anchor the outwardly converging blocks firmly to the outer wall, advantageously via its cooled lining as mentioned above, and to provide the inwardly converging blocks with lost-motion couplings of the aforedescribed kind linking them with the inner metallic shell to act as the aforementioned guide means. In order to facilitate thermal distension of the shell in an axial direction, the same may be subdivided into axially separated sections interconnected by expansion joints.

BRIEF DESCRIPTION OF THE DRAWING

The above and other features of my invention will now be described in detail with reference to the accompanying drawing in which.

SPECIFIC DESCRIPTION

Figure 1:
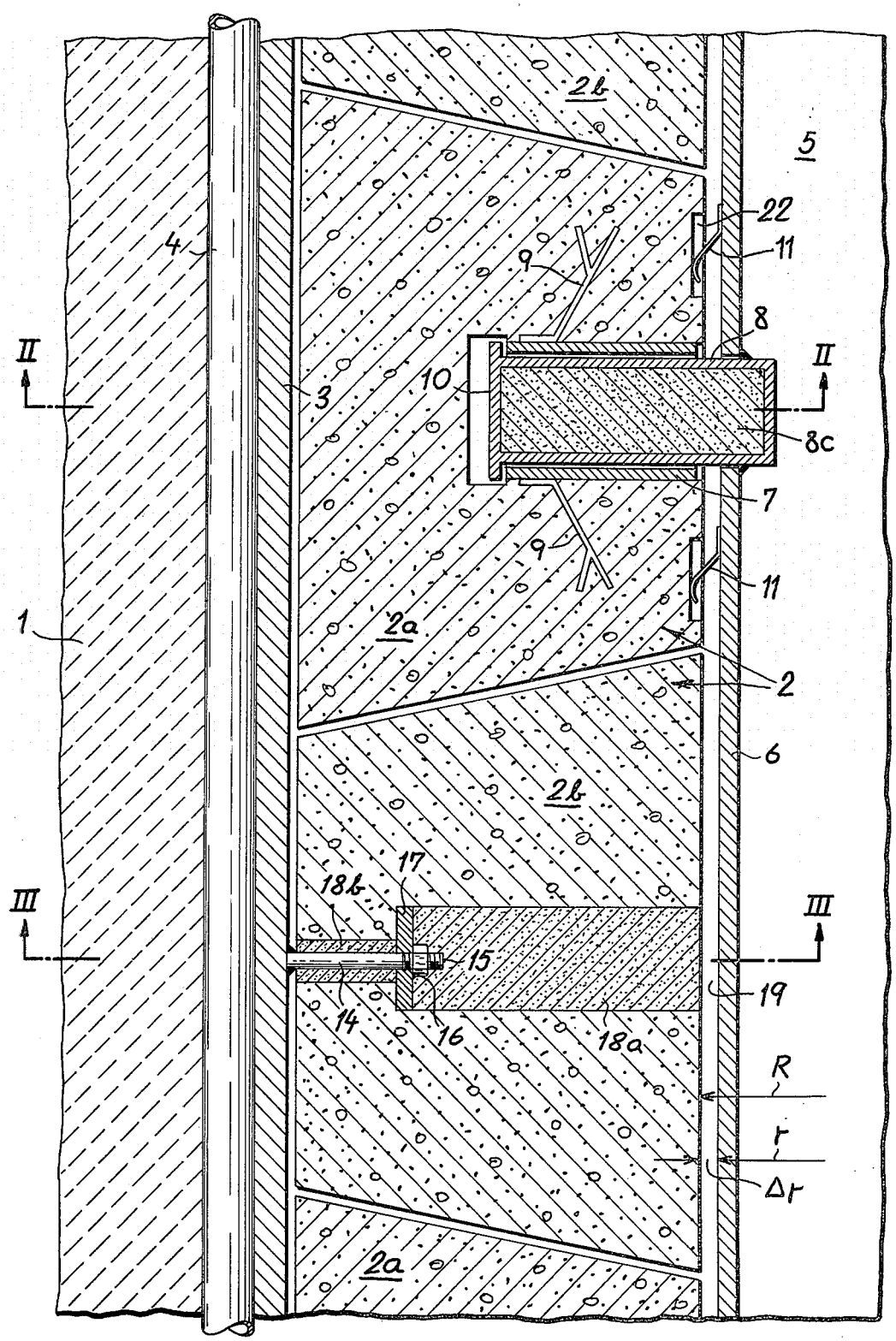
FIG. 1 is a fragmentary but representative sectional view, taken in a horizontal radial plane, of a wall structure of a pressure chamber embodying my invention.
Figure 2:
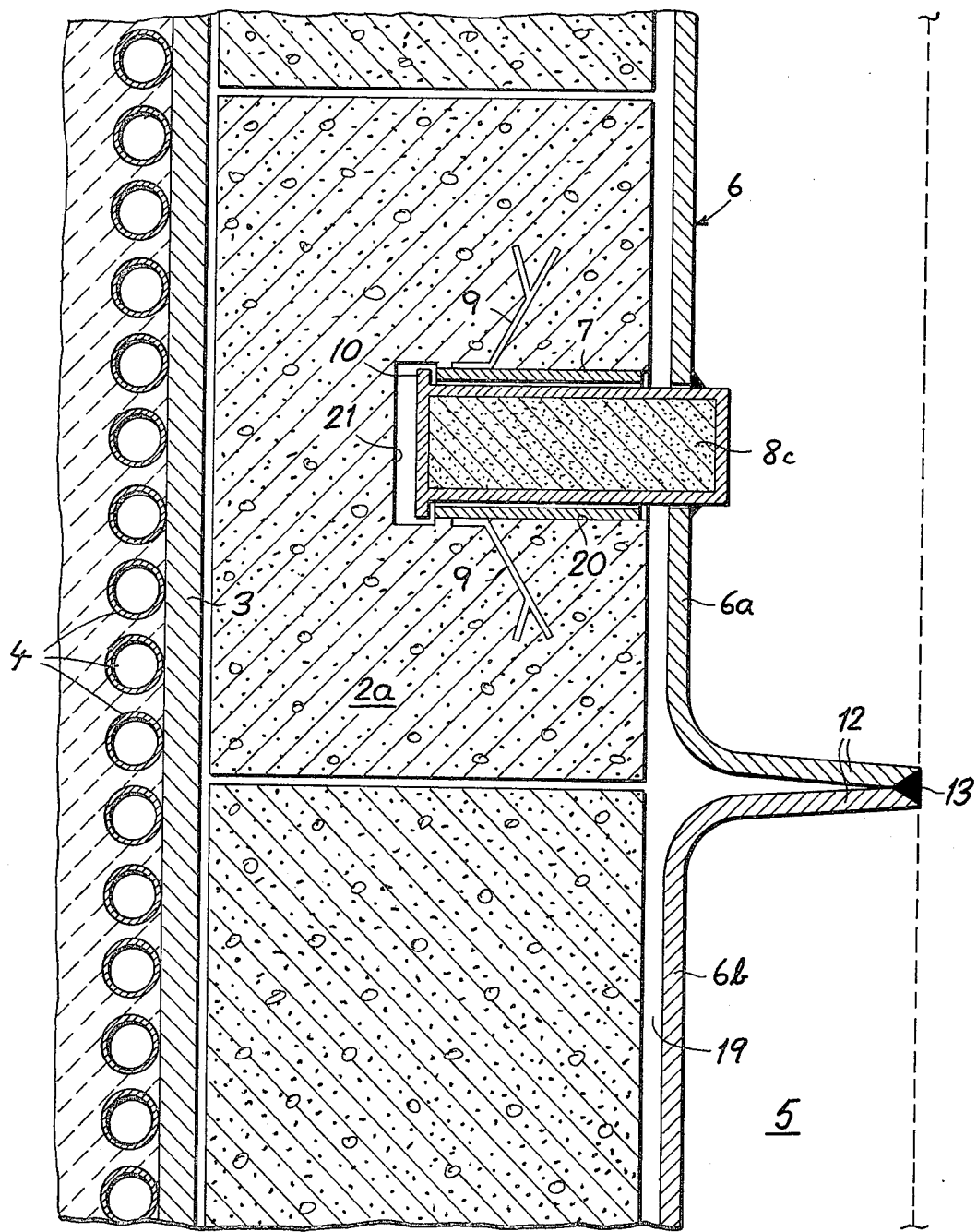
FIGS. 2 and 3 are fragmentary cross-sectional views taken respectively on lines II — II and III — III of FIG. 1.
Figure 3:
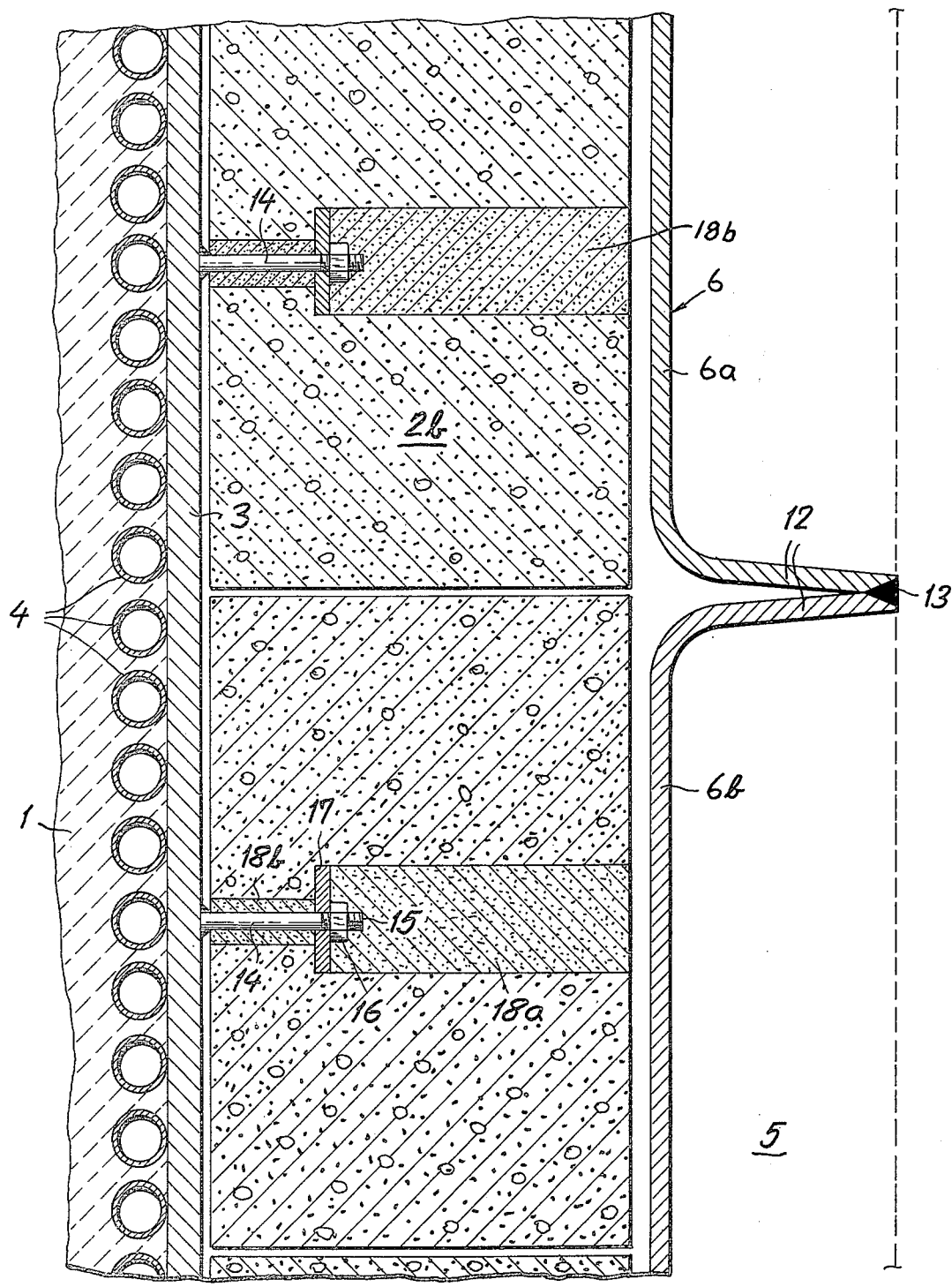

The pressure chamber shown in the drawing, designed for a nuclear reactor, comprises a refractory peripheral wall 1 centered on a vertical axis and provided with a steel lining 3 cooled by a set of fluid conduits 4. A concrete layer 2, coaxial with wall 1, consists of a multiplicity of tiers 2a and 2b each composed of an annular array of sectoral blocks, the blocks of alternate tiers 2a having trapezoidal cross-sections converging toward the horizontal chamber axis (i.e. to the right in FIG. 1) whereas the blocks of the intervening tiers 2b converge toward the outer periphery of the cylindrical structure. A space 5, connected to conventional reactor equipment (not shown), contains a fluid which, in operation, develops high pressures and temperatures. Insulating layer 2 is sealed from this fluid by a steel shell 6 also centered on the axis of wall 1.

The inner radius R of layer 2 (assumed to be so large that the curvature is not apparent in FIG. 1) exceeds the outer radius $r$ of shell 6 by a distance $\Delta r$ which is the depth of an annular clearance 19 separating these two coaxial members from each other in the cold, unoperated state of the assembly. This depth $\Delta r$ is so chosen that, at the expected operating pressures and temperatures, shell 6 can expand radially into contact with layer 2 without exceeding its elastic limit, this expansion peripherally pretensioning the shell with a stress $$\sigma_1 = \frac{\Delta r}{r} E$$

where E is the modulus of elasticity of the steel. The heating of the shell as it contacts the layer 2 generates a countervailing peripheral stress $\sigma_2 = \alpha_t TE$ ($\alpha_t$ being a coefficient and T being the absolute temperature) so as to reduce the stresses within the metal even as its yield point decreases at the elevated temperatures, with the resulting stress $\sigma = \sigma_1 - \sigma_2$ always remaining below that yield point under all operating conditions. Naturally, the stress $\sigma_1$ should be below the elastic limit of the steel employed.

Shell 6 is axially subdivided into a number of sections 6a, 6b (only two shown) interconnected by an expansion joint which is formed by two generally frustoconical internal flanges 12 welded together at their inner periphery 13.

In order to provide the shell 6 and the layer 2 with limited relative radial mobility while holding them in proper axial and angular alignment, some of the inwardly diverging blocks of tiers 2a are provided with lost-motion couplings (only one shown) in the form of radial studs 8 which are welded to the shell 6 and project outwardly into bores 20 of the blocks. The bores 20 have extensions 21 of larger diameter accommodating heads 10 of studs 8 which lie beyond sleeves 7 lining the bores 20, the sleeves being firmly anchored to the concrete of the blocks by stirrups 9.

Leaf springs 11, fastened to shell 6, are receivable in recesses 22 of layer 2 and tend to hold the shell 6 away from the layer 2, thereby maintaining the clearance 19; these springs are, of course, uniformly distributed along the periphery of the shell, as are the couplings 7 – 10.

The blocks of layer 2 are separated from one another and from the lining 3 by small gaps in the cold state so as to enable also their thermal expansion. Within tiers 2b, at peripherally equispaced locations, the blocks are fixedly anchored to lining 3 by means of bolts 14 welded thereto, the bolts traversing anchor plates 17 embedded in the concrete; the threaded tips 15 of the bolts are engaged by nuts 16. After assembly, the bolts and the nuts are immobilized within layer 2 by grouting 18a and 18b.

The studs 8, as shown, are hollow and filled with cementitious material 8c to make their thermal expansion coefficient similar to that of the surrounding blocks. The sleeves 7 are firmly imbedded in the concrete of these blocks.

I claim:

1. A pressure chamber for confining a hot expanding fluid, comprising:
    a cylindrical structure including a layer of low thermal conductivity;
    a cylindrical shell of metal within said structure coaxial with said layer and spaced therefrom in an unoperated state by an annular clearance enabling radial expansion of said shell under pressure of said fluid, the depth of said clearance being sufficient to enable pretensioning of said shell in peripheral direction for reducing thermally induced stresses in said shell upon contact thereof with said layer to less than the yield point of said metal; and
    countersunk guide means on said layer engaging said shell for maintaining said clearance in the absence of fluid pressure and facilitating said radial expansion with substantially complete elimination of said clearance, said structure comprising a refractory wall provided with a metallic lining surrounding said layer, said lining being provided with anchor means engaging said layer, said layer being axially subdivided into a plurality of tiers of sectoral blocks of trapezoidal axial cross-sections converging alternately outwardly and inwardly on adjoining tiers, said anchor means engaging the blocks with outwardly converging cross-sections, said guide means comprising lost-motion couplings partly received in at least some of the blocks with inwardly converging cross-section.

2. A pressure chamber as defined in claim 1 wherein said guide means comprises a sleeve seated in a radial bore of said layer and a stud on said shell slidably received in said sleeve.

3. A pressure chamber as defined in claim 2 wherein said stud is provided with a head of larger diameter than said sleeve received in an extension of said bore beyond said sleeve with freedom of limited longitudinal displacement.

4. A pressure chamber as defined in claim 1, further comprising countersunk spring means in said clearance urging said shell away from said layer.

5. A pressure chamber as defined in claim 4 wherein said spring means comprises a plurality of leaf springs supported on the outer surface of said shell, said layer being provided with recesses accommodating said leaf springs.

6. A pressure chamber as defined in claim 1 wherein said shell consists of a plurality of axially separated sections provided with interconnected inwardly projecting annular flanges forming expansion joints therebetween.

7. A pressure chamber as defined in claim 1 wherein said lining is provided with cooling means.

* * * * *